US007295953B2

(12) United States Patent
Cox et al.

(10) Patent No.: US 7,295,953 B2
(45) Date of Patent: Nov. 13, 2007

(54) SCENARIO BASED TESTING AND LOAD GENERATION FOR WEB APPLICATIONS

(75) Inventors: John S. Cox, Apex, NC (US); Gennaro A. Cuomo, Apex, NC (US); Brian Keith Martin, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/026,384

(22) Filed: Dec. 21, 2001

(65) Prior Publication Data

US 2003/0120463 A1 Jun. 26, 2003

(51) Int. Cl.
*G06F 11/00* (2006.01)

(52) U.S. Cl. ............... 702/186; 702/122; 702/119; 702/123; 709/203; 714/38

(58) Field of Classification Search ............ 703/22; 717/124, 127, 131; 714/33, 47, 25, 38; 709/224, 709/203, 200; 702/186, 119, 122, 123, 179, 702/182, 183, 185, 187, 188, FOR. 103, 702/FOR. 104, FOR. 134, FOR. 135, FOR. 139, 702/FOR. 170, FOR. 171
See application file for complete search history.

(56) References Cited

U.S. PATENT DOCUMENTS

| 5,974,572 | A | * | 10/1999 | Weinberg et al. ............ 714/47 |
| 6,002,871 | A | * | 12/1999 | Duggan et al. ............ 717/135 |
| 6,044,398 | A | * | 3/2000 | Marullo et al. ............ 709/219 |
| 6,560,564 | B2 | * | 5/2003 | Scarlat et al. ............ 702/186 |
| 7,043,460 | B2 | * | 5/2006 | Deboer et al. ............ 706/10 |
| 2002/0156881 | A1 | * | 10/2002 | Klopp Lemon et al. .... 709/224 |

OTHER PUBLICATIONS

*Java Technologies for the Server,* AppDev Studio Developer's Site: Servlets and JSP, <http:\\www.sas.com/rnd/appdev/tech/serverjava.htm> (Dec. 10, 2001), 2 pages.
*Redirecting, Forwarding, and Request Delegation,* AppDev Studio Developer's Site: webAF, <http:\\www.sas.com/rnd/appdev/webAF/server/requestDelegation.htm> (Dec. 10, 2001), 4 pages.
A. Shah, *Web Site Performance: Can You Handle The Traffic?,* <http://www.velocigen.com/press/pressdocs/webperf/weperf.html> (Dec. 10, 2001), 12 pages.

* cited by examiner

*Primary Examiner*—Hal Wachsman
(74) *Attorney, Agent, or Firm*—A. Bruce Clay, Esq.; Steven M. Greenberg, Esq.

(57) ABSTRACT

In a Web application testing method which has been configured in accordance with the present invention, a network message from one of several network clients can be intercepted. Session data in the network message can be identified and state information retrieved for the session in the Web application. An operation and corresponding associated parameters can be selected from a Web scenario template based upon the retrieved state information. Finally, operations can be invoked in the Web application, the operations corresponding to the operation and associated operational parameters selected from the Web scenario template.

15 Claims, 2 Drawing Sheets

SCENARIO BASED TESTING AND LOAD GENERATION FOR WEB APPLICATIONS

BACKGROUND OF THE INVENTION

1. Statement of the Technical Field

The present invention relates to the field of software testing and more particularly to Web application testing.

2. Description of the Related Art

Ensuring the quality and operation of a Web application can be an expensive and complex task. Typically, the task of testing a Web application entails a client-side load driving mechanism capable of accurately emulating a population of Web application end-users. In particular, each emulated end-user can forward interactive requests to the Web application using a traditional access device, for instance a Web content browser. Resulting responses, however, need not be rendered in the Web content browser. Rather, in the testing framework, resulting responses can be interpreted programmatic ally.

Web applications generally include a set of user "scenarios" which ought to be tested prior to being deployed. A scenario can include a sequence of individual Web requests which together form a higher level, logical operation. Each individual action may be dependent upon the results from a prior request. For example, in an online stock brokerage, a scenario could include an account request to view the current balance and available funds, the results being used to calculate an amount to invest. Second, a quote request can be issued to view the current trading price of a stock of interest. The results from the quote request can be used to calculate the number of shares to purchase. Finally, a purchase order can be placed for the purchase of some amount of shares with the results being used to verify both the purchase and the new account balance.

Notably, managing the combined visual, stateless and dynamic nature of interactive requests and the resulting responses in a Web scenario can require complex software and significant hardware resources. In particular, Web content is designed for human visual consumption and not for machine analysis. In that regard, inside the testing framework the resulting responses can be difficult and resource intensive to parse and interpret in the load driving mechanism. For example, when testing a conventional Web application, typically the client-side load driving mechanism posts user requests through forms and gleans the results of those requests through complex parsing of response data. Subsequently, forms from the response can be completed and used to submit the next operation in the testing sequence.

In view of the stateless nature of the underlying network protocols used to shuttle requests and responses between the client side and the server side, the state of a Web application scenario typically is maintained by the Web application on the server rather than in the client. In order to drive Web scenarios in a testing framework, though, the complete user state also must be managed for the population of users by the load driving mechanism in the client. Hence, the effective testing of Web scenarios can result in the inefficient duplication of the state management effort both in the client and server.

SUMMARY OF THE INVENTION

The present invention is a Web testing system and method which overcomes the deficiencies of prior art Web testing systems and methods. Specifically, in accordance with the inventive arrangements, a method and system can be provided which can test Web application scenarios without requiring the deployment of complex client-side testing software. Rather, in the present invention, a server-side load driving mechanism can invoke a series of Web application operations in the Web application based upon a scripted scenario specified in a Web scenario template. Resource intense analysis of Web application responses can be avoided inasmuch as the server-side load driving mechanism can continue to invoke additional Web application operations based not upon the responses to previously invoked operations, but based upon the state of the Web application stored in the server.

A system for testing a Web application can include a Web scenario template specifying a sequence of Web application operations and associated operational parameters. Each operation can have an association with an identifiable state of the Web application. The system also can include a server-side load driving mechanism configured to select individual ones of the operations and associated operational parameters in the Web scenario template. The combination of the template and the server-side load driving mechanism in lieu of complex server-side load driving mechanisms can significantly reduce the complexity of the Web application testing process.

Specifically, the server-side load driving mechanism can select the operations and operational parameters based upon an identified state of the Web application. Subsequently, the server-side load driving mechanism can dispatch operations in the Web application which correspond to the selected operations and associated operational parameters. In consequence, the repetitive use of the server-side load driving mechanism can test a complete set of Web application scenarios without requiring complex interactions between client and server.

In a Web application testing method, a network message from one of several network clients can be intercepted. Session data in the network message can be identified and state information retrieved for the session in the Web application. An operation and corresponding associated parameters can be selected from a Web scenario template based upon the retrieved state information. Finally, operations can be invoked in the Web application, the operations corresponding to the operation and associated operational parameters selected from the Web scenario template.

Notably, the method can further include intercepting a network response to the invoked operations. Once intercepted, the network response can be forwarded to the network client. Additionally, new state information for the Web application can be retrieved which corresponds to the identity of the network client. Subsequently, the selecting, and invoking steps can be repeated for the new state information.

In one aspect of the invention, the intercepting step can include receiving a hypertext transfer protocol (HTTP) formatted network message in a load driving servlet communicatively linked to the Web application. In another aspect of the invention, the dispatching step can include executing a dispatch-include servlet operation based upon the selected operation and associated operational parameters. Finally, in yet another aspect of the invention, application performance data can be logged during the Web application testing.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a server-side Web scenario load driving mechanism which can be used to test Web applications in an efficient manner which heretofore has required the expenditure of substantial network resources. Specifically, a server-side load driving mechanism can intercept generic requests to a Web application under study, responsive to which the server-side load driving mechanism can identify selected operations specified in a Web scenario template. Based upon the selected operations in the Web scenario template, the server-side load driving mechanism can access corresponding operations in the Web application.

Importantly, the server-side load driving mechanism can select those operations from the Web scenario template which correspond to the current state of the Web application. Hence, unlike prior art client-side load driving mechanisms, the server-side load driving mechanism of the present invention need not parse and process those requests generated by client-side load drivers. Rather, in the present invention, the server-side load driving mechanism can generate a testing load based solely upon those operations in the Web scenario template and the current state of the Web application.

Figure 1:
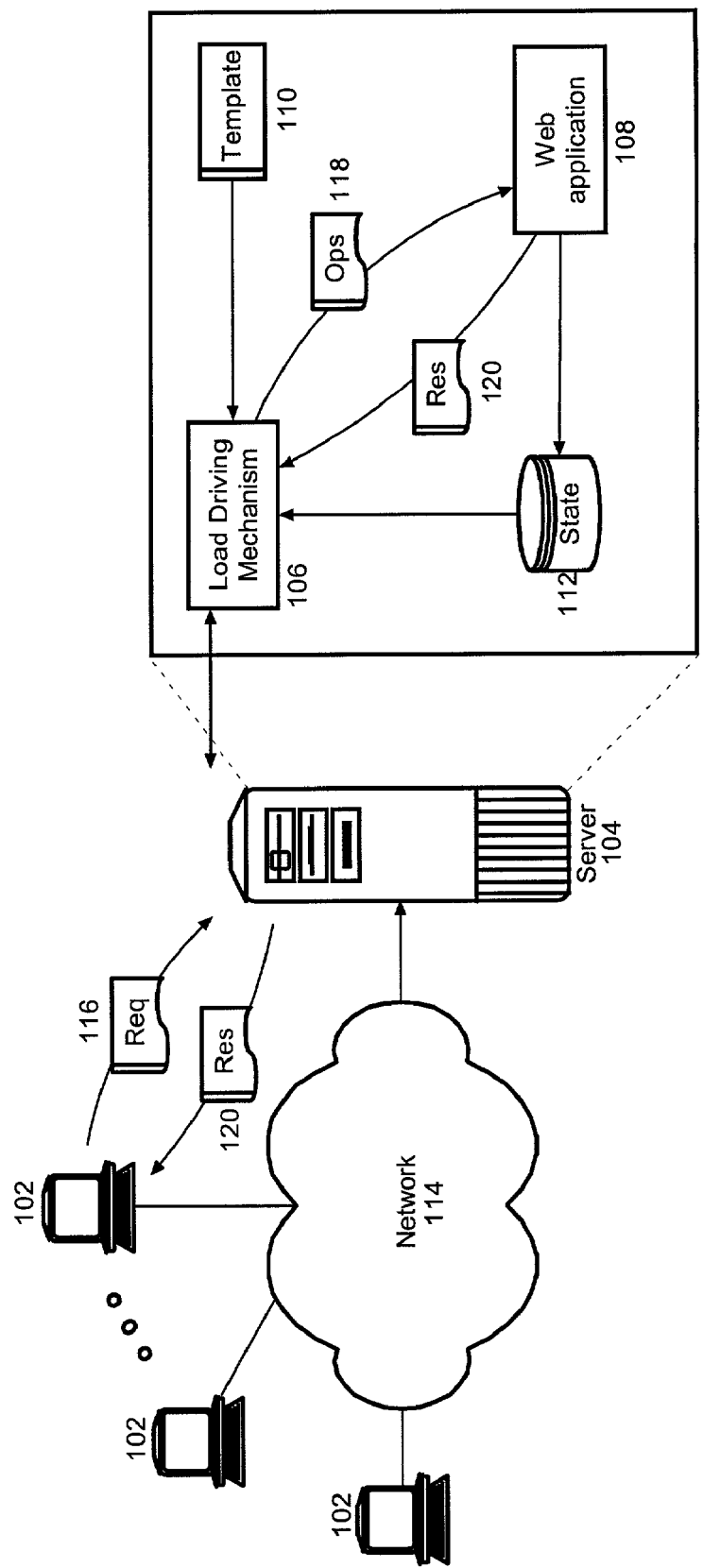
FIG. 1 is an schematic illustration of a Web application testing system which has been configured according to the inventive arrangements.

FIG. 1 is a schematic illustration of a Web application testing system which has been configured with the server-side load driving mechanism of the present invention. Specifically, the testing system can include a load driving mechanism 106 disposed within a server 104 which has been communicatively linked to one or more clients 102 over a computer communications network 114. The clients 102 can forward requests 116 to the server 104, for example hypertext transfer protocol (HTTP) requests for Web content. Conversely, the clients 102 can receive over the network 114, HTTP responses 120 to the requests 116, the responses in some cases containing content which can be rendered in content browsers of the clients 102.

A Web application 108 can be disposed in the server 104. The Web application 108 can be configured to respond to requests 116 from clients 102 with content encapsulated in responses 120. More particularly, the Web application 108 can be a conventional scenario-driven Web application which can store its corresponding state and session information in a data store 112, such as fixed storage. In consequence, the data store 112 can be accessed by other external entities, such as the server-side load driving mechanism 106, which can be communicatively linked to the server 104 hosting the Web application 108, and preferably can be disposed within the server 104 hosting the Web application 108.

Still, although the Web application 108, the server-side load driving mechanism 106 and data store 112 are shown to reside within a single server 104, the invention is not so limited. Rather, in a clustered aspect of the invention, one or more of the Web application 108, server-side load driving mechanism 106 and the data store 112 can be distributed across one or more respective servers. In that case, each server can be communicatively linked to one another over the network 114.

In accordance with the present invention, the server-side load driving mechanism can be invoked through generic requests 116 received from invoking clients 102 over the network 114. A generic request 116 can be any type of network request encapsulating any type of content, though preferably the generic request 116 contains minimal information suitable only to provide enough information to identify the source of the request and that it is a request which should be intercepted by the load driving mechanism 106.

Upon invocation, the load driving mechanism 106 can access the data store 112 holding state and session information for the Web application 108 under study. As will be recognized by one skilled in the art, the state information in the data store 112 can vary from session to session. Furthermore, each session can be determined from the contents of the intercepted generic request 116. In any case, using the retrieved state information for the particular session, the server-side load driving mechanism 106 can consult a template 110 configured for a particular Web scenario.

In accordance with the inventive arrangements, the template 110 can specify one or more states, associated operations and corresponding operational parameters, and expected results from the operations. Each entry in the template 110 can reflect a portion of a Web scenario which can be performed in the Web application 108. For example, the template 110 can include a list of particular operations and corresponding operational parameters, such as an operation to retrieve account information based on a provided account number, an operation to display a list of products for sale based on a product type and price range, and an operation to purchase selected ones of the products in the list. Individual operations can be selected in the scenario according to the current state of the Web application.

Returning now to FIG. 1, depending upon the retrieved state information, the server-side load driving mechanism 106 can select one or more of the operations and corresponding operational parameters specified in the template 110. Using the selected operation or operations and corresponding operational parameters, the server-side load driving mechanism 106 can invoke corresponding operations 118 of the Web application 108 to execute a Web application 108 process. In particular, the server-side load driving mechanism 106 can access one or more corresponding operations 118 in the Web application 108 as if an end-user had performed interactive operations in a content browser to cause the execution of a similar The processing in the Web application 108 can result in a response 120 which can be returned to the requesting client 102 via the server-side load driving mechanism 106. Notably, the load driving mechanism 106 need not parse the response 120, however, to determine the next series of operations to perform in the Web application 108 to continue or complete the Web scenario. Rather, upon receiving a response 120 from the Web application 108, the server-side load driving mechanism 106 can again inspect the state information for the Web application 108 based upon the session identity. In consequence, the server-side load driving mechanism 106 can select the next series of API calls 118 for execution in the Web application 108.

Figure 2:
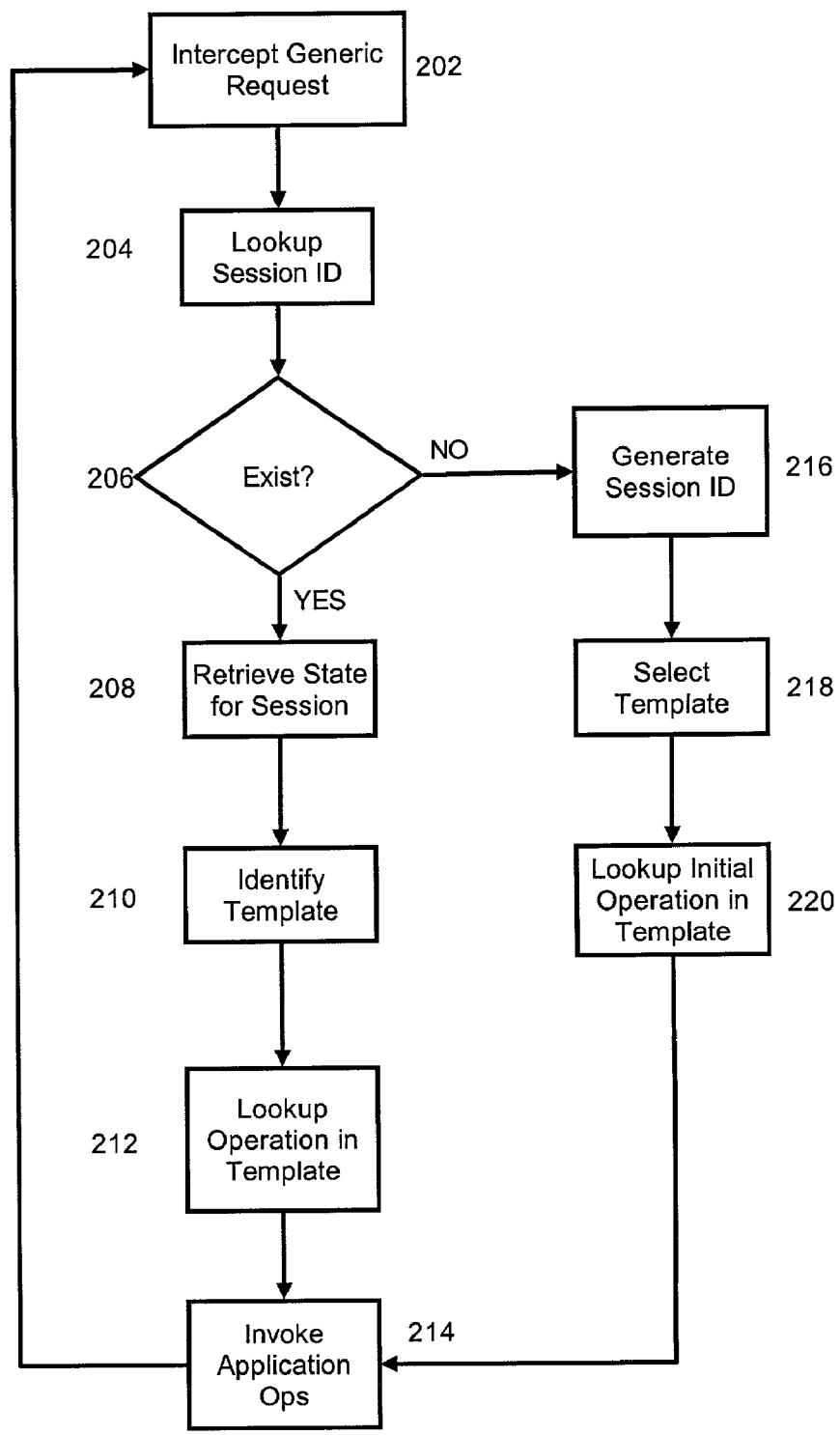
FIG. 2 is a flow chart illustrating a process for scenario based testing and load generation for use in the system of FIG. 1.

FIG. 2 is a flow chart illustrating one aspect of a process for testing a Web application using the server-side load driving mechanism of FIG. 1. In particular, in the process of FIG. 2, the server-side load driving mechanism can perform an automated Web application testing process based upon a Web scenario specified in a Web scenario template. Beginning in block 202, the server-side load driving mechanism can intercept a network message communicated between the Web application and a requesting client. The network request can be a generic request intended only to trigger the application testing process.

In block 204, the generic request can be inspected and a session ID can be determined based upon the identity of the requesting client. In particular, the requesting client can be identified based upon header information within the network message. In decision block 206, it can be determined whether a session ID for the requesting client has already been established. If so, in block 208, the state information can be retrieved for the session. Subsequently, in block 210 a scenario template corresponding to the session can be identified.

If, in decision block 206 it is determined that the session ID has not been established, in block 216 a session ID can be established for the requesting client. Subsequently, in block 218 a template can be selected for use in the newly established session. In particular, while in one aspect of the invention, a single scenario template can be used for each session, in an alternative aspect of the invention, a scenario template can be programmatic ally selected from among a set of templates. For instance, a mixing percentage can be specified which specifies the frequency that a particular scenario is tested based upon the testing of other scenarios. Thus, if a "stock purchase" scenario is to be tested 20% of the time, then every five sessions will result in the testing of the "stock purchase scenario".

Returning now to block 210, once the template has been identified for the existing session, one or more operations can be selected from the template based upon the current state of the Web application for the identified session. By comparison, in block 220, one or more initial operations can be selected from the template where no operations for the scenario had been previously performed. In any case, in block 214, the operation can be dispatched to the Web application.

One skilled in the art will recognize, however, that many techniques exist for dispatching a network request to a Web application. For example, where the server-side load driving mechanism is implemented as a servlet, the "dispatch.include(req, res)" method can be utilized. Still, the invention is not limited in regard to the manner in which the emulated network request is forwarded to the Web application and other methods can suffice. In consequence, the Web application can perform the operation specified in the template transparently as if an end-user had requested the operation using conventional means.

Notably, the server-side load driving mechanism also can intercept Web application responses to the dispatched operations of block 214. In particular, the responses can be conventional network responses which generally can encapsulate Web content. While these network responses can be dispatched on to the requesting client, the server-side load driving mechanism need not parse the response in order to determine the state of the Web application following the response.

Rather, in response to detecting a response, the server-side load driving mechanism merely can retrieve the state information for the requesting client in block in the same manner as if a network request had been intercepted. Subsequently, the next sequential operation specified by the Web scenario template can be selected and a corresponding operations can be dispatched to the Web application. Thus, a complete end-to-end test of the Web application can be achieved without requiring the creation and deployment of complex client-side technology.

The testing performed by the server-side load driving mechanism can be used to measure application performance. In particular, the testing can be used to confirm the logical integrity of the application. That is, each Web scenario can be tested to ensure that the appropriate responses are received as a result of the invocation of particular Web application operations. Still, the invention is not limited in this regard and the testing performed by the server-side load driving mechanism also can be used to measure application performance, including high-availability, response times and the like.

In consequence of the present invention, only simple network requests are required to initiate processing in the server-side load driving mechanism. Importantly, complex markup and associated forms are not required. Also, only server-side state information need be tracked as the load driving mechanism resides in the server, rather than in the client. Furthermore, by relying upon server-side state information, complex parsing of network responses can be avoided. Finally, using a dispatch-include technique, both for dispatching the template-driven operations to the Web application and for dispatching responses to the requesting clients, provides for the transparent testing of the Web application. As a result, thorough end-to-end testing of the Web application can be provided.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A system for testing a Web application comprising:
 a Web scenario template specifying a sequence of Web application operations and associated operational parameters, each said operation having an association with an identifiable state of the Web application; and, a server-side load driving mechanism configured to select individual ones of said operations and associated operational parameters in said Web scenario template based upon an identified state of the Web application, said server-side load driving mechanism being further configured to dispatch operations in the Web application which correspond to said selected ones of said operations and associated operational parameters.

2. A Web application testing method comprising the steps of:

identifying session data in an intercepted network message and retrieving state information for said session in the Web application;

selecting an operation and associated operational parameters from a Web scenario template based upon said retrieved state information; and, invoking said operation in the Web application as selected from said Web scenario template in lieu of invoking an operation in the Web application based upon said intercepted network message.

3. The method of claim 2, further comprising the steps of:

intercepting a network response to said invoked operation;

retrieving new state information for the Web application corresponding to said session in the Web application; and, repeating said selecting and invoking steps for said new state information regardless of said network response.

4. The method of claim 3, further comprising the step of logging application performance data during the Web application testing.

5. The method of claim 2, further comprising the step of intercepting a hypertext transfer protocol (HTTP) formatted network message in a load driving servlet communicatively linked to the Web application and remotely positioned from a client transmitting said HTTP formatted network message.

6. The method of claim 2, wherein said invoking step comprises the step of executing a dispatch-include servlet operation based upon said selected operation and associated operational parameters.

7. The method of claim 2, wherein said selecting comprises the steps of:

selecting one of a set of Web scenario templates; and, further selecting from within said selected Web scenario template, an operation and associated operational parameters based upon said retrieved state information.

8. The method of claim 7, wherein said step of selecting one of a set of Web scenario templates comprises the steps of:

establishing a mixing percentage for each one of said Web scenario templates, said mixing percentage specifying a frequency for which said Web scenario template will be selected; and, selecting said one of said set of Web scenario templates according to said established mixing percentage for said one of said set of Web scenario templates.

9. A machine readable storage having stored thereon a computer program for Web application testing, said computer program comprising a routine set of instructions which when executed by the machine cause the machine to perform the steps of:

identifying session data in an intercepted network message and retrieving state information for said session in the Web application;

selecting an operation and associated operational parameters from a Web scenario template based upon said retrieved state information; and, invoking said operation in the Web application as selected from said Web scenario template in lieu of invoking an operation in the Web application based upon said intercepted network message.

10. The machine readable storage of claim 9, further comprising the steps of:

intercepting a network response to said invoked operations;

retrieving new state information for the Web application corresponding to said session in the Web application; and, repeating said selecting and invoking steps for said new state information regardless of said network response.

11. The machine readable storage of claim 10, further comprising the step of logging application performance data during the Web application testing.

12. The machine readable storage of claim 9, further comprising the step of intercepting a hypertext transfer protocol (HTTP) formatted network message in a load driving servlet communicatively linked to the Web application and remotely positioned from a client transmitting said HTTP formatted network message.

13. The machine readable storage of claim 9, wherein said invoking step comprises the step of executing a dispatch-include servlet operation based upon said selected operation and associated operational parameters.

14. The machine readable storage of claim 9, wherein said selecting comprises the steps of:

selecting one of a set of Web scenario templates; and, further selecting from within said selected Web scenario template, an operation and associated operational parameters based upon said retrieved state information.

15. The machine readable storage of claim 14, wherein said step of selecting one of a set of Web scenario templates comprises the steps of:

establishing a mixing percentage for each one of said Web scenario templates, said mixing percentage specifying a frequency for which said Web scenario template will be selected; and, selecting said one of said set of Web scenario templates according to said established mixing percentage for said one of said set of Web scenario templates.

* * * * *